United States Patent [19]
King

[11] Patent Number: 4,597,187
[45] Date of Patent: Jul. 1, 1986

[54] COMPRESSOR VANE GAGE
[75] Inventor: Daniel L. King, Whitehall, Mich.
[73] Assignee: United Technologies Corporation, Hartford, Conn.
[21] Appl. No.: 683,790
[22] Filed: Dec. 19, 1984
[51] Int. Cl.[4] ............................................... G01B 7/28
[52] U.S. Cl. ................................. 33/552; 33/172 E; 33/169 R
[58] Field of Search .............. 33/174 P, 172 E, 172 B, 33/174 R, 148 H, 169 R, 179.5 R, 179.5 D, 174 L

[56] References Cited
U.S. PATENT DOCUMENTS 3,318,009  5/1967  Tisher et al. ....................... 33/174 P
3,945,126  3/1976  Bloch .............................. 33/179.5 R
4,024,646  5/1977  Griggs .............................. 33/174 P
4,324,049  4/1982  Blose ............................... 33/174 P

FOREIGN PATENT DOCUMENTS 2810552  9/1978  Fed. Rep. of Germany ........ 33/554

Primary Examiner—Willis Little
Attorney, Agent, or Firm—Charles A. Warren

[57] ABSTRACT

A quarter chord angle gage having a base with several gage points therein to engage the vane near its leading or trailing edge, the base being rotary to bring the points into contact with the vane, and the base carrying a cam to indicate the position of the base when the gage points are all in contact with the vane. Suitable electrical means sense this point contact and record the portion of the cam and thus the quarter chord angle.

12 Claims, 4 Drawing Figures

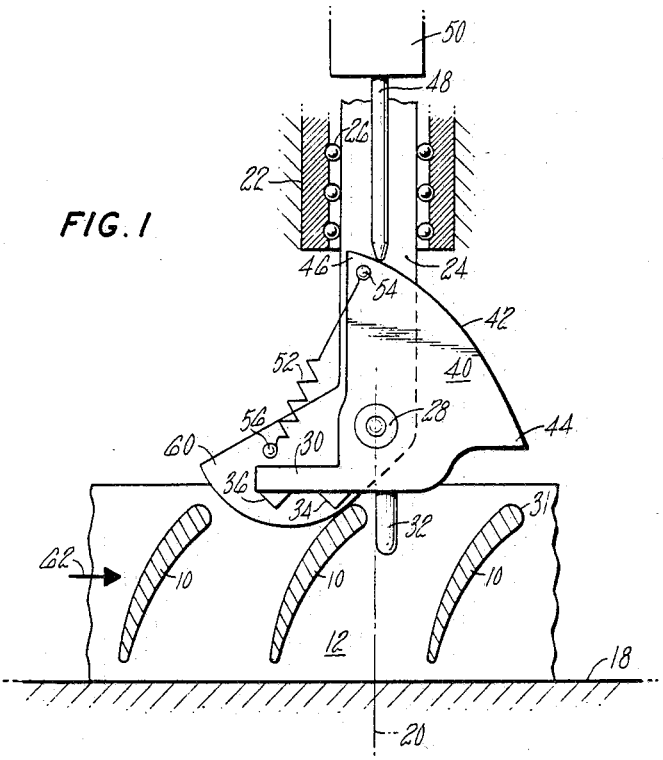
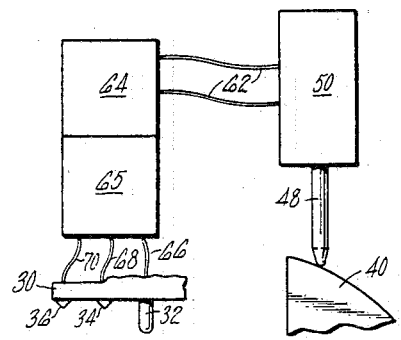
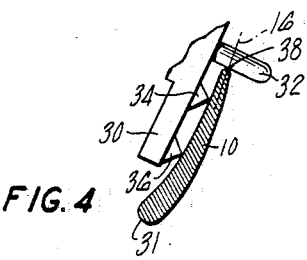

COMPRESSOR VANE GAGE

DESCRIPTION

1. Technical Field

This invention is a gage by which to measure the quarter chord angle of the leading edge or trailing edge of each vane in a row of compressor vanes mounted in the vane assembly. This assembly includes inner and outer stator rings between which the vanes extend and within which they are securely mounted. The invention is particularly concerned with a device for successively measuring the individual angles of each of the vanes in the row of vanes.

2. Background Art

The angle of leading and/or trailing edge of the vanes in a row of compressor vanes particularly in a multi-stage axial flow compressor is critical to the performance of the compressor and particularly to the efficiency of the compressor as a unit. The vanes are regularly permanently mounted in a row between inner and outer stator rings and it is routine to check either or both quarter chord angles of each ring after the row of vanes is assembled to assure that the quarter chord angle of all the vanes are within the design limits.

This had been done usually with a hand operated gage that is manually positioned on each vane individually and when several gage points on the gage are all in contact with the vane the angle is measured with respect to a leveling device forming a part of the gage. This is a time-comsuming process particularly in man hours merely in inspection of the vane assembly. It is desirable to determine the chord angle with several points lengthwise of each vane and thus the time involved is greatly increased. It will be understood that the chord angle routinely varies from the outer end to the inner end of each of the vanes so that inspection is routinely necessary at least at both ends and generally midway between the ends. Obviously, if the vane angles are not within the design limits, the vane assembly must be discarded or have the vanes reshaped to meet the required limits.

It is desirable to simplify the inspection system to determine the quarter chord angle to assure accuracy of both the leading and trailing edges and particularly to reduce the time required for the inspection of each vane assembly.

3. Disclosure of Invention

The principal feature of the present invention is a quarter chord angle gage that will individually and successively inspect each vane of the row of vanes at the desired location lengthwise of each vane and establish the precise quarter chord angle of each vane. Another feature is a gage mechanism that will record the angle of each vane as compared to the design standard so that it is easily established whether the vane assembly is acceptable.

According to the invention the gage mechanism has a plurality of gage points mounted on a pivoted base that carries a cam movable as the base is pivoted to cause the gage points all to contact the vane simultaneously. One of the gage points engages the vane on the leading edge or trailing edge and the other two points are arranged to contact the surface of the vane at points spaced chordwise along the surface of the vane at the quarter chord location. When all three gage points are in contact, suitable sensors determine the precise position of the cam which is an indication of the angularity of the vane at the time that the point contact occurs. Obviously, the angularity of the base at that time is a precise indication of the quarter chord angle.

The base is mounted on a slide so that as the gage moves relative to the row of vanes the base and gage points therein would be retracted from the vane being inspected so that the vane may pass under the gage in order to place the next vane in a position for inspection. The device includes a transducer to sense the position of the cam when the several gage points are all in contact with the vane, and this sensed position is electronically recorded to provide the desired record of the quarter chord angle. As this inspection continues the result of a record of the quarter chord angle for all the vanes in the row of vanes after the inspection of the entire row is completed. The slide carrying the vane also carries a guide to protect the gage points as the gage moves relatively to the successive vanes, and this guide serves to keep the gage points out of contact with the edge of each vane as it moves underneath the gage. It will be understood that the device is intended to inspect the vane during the continuous movement of the row of vanes underneath the guide and thereby significantly reduces the time needed for a full inspection of the entire row of vanes.

The foregoing and other objects, features and advantages of the present invention will become more apparent from the following description of preferred embodiments and accompanying drawings.

BRIEF DESCRIPTION OF DRAWINGS

FIG. 1 is an elevation of the gage device in starting position relative to the vane assembly and with parts broken away to show the operation better.

FIG. 2 is a diagramatic view of the transducer and the associated recording mechanism.

FIG. 3 is a diagramatic view of the gage and base in a position with all of the gage points in contact with the vane at which time the quarter chord angle is sensed by the device.

FIG. 4 is a view similar to FIG. 3 showing the device in the same position as FIG. 3 but on the trailing edge of the vane rather than on the leading edge as in FIGS. 1-3 inclusive.

BEST MODE FOR CARRYING OUT THE INVENTION

The invention is shown as being used to inspect a row of compressor vanes 10 positioned in a ring and with the vanes extending between inner and outer rings only one of which, the inner ring 12 is shown. It will be understood that the vanes extend between the two rings and are securely positioned in each so that the quarter chord angle 14 of the leading edge, or the angle 16 of the trailing edge, is fixed with respect to the axis of the vane assembly.

In the arrangement shown the vane assembly is positioned on a table 18 mounted to turn on a vertical axis 20. The vane assembly is mounted so that its axis coincides with the table axis. In this way rotation of the table underneath the gage will rotate the vane assembly on its axis.

The assembly is positioned under a gage support 22 within which is positioned a slide 24 movable on a vertical axis as shown and provided for by means of the linear bearing 26. The lower end of the slide has a pivotal support 28 which may be a bushing on which the gage base 30 is provided. This base carries three gage points for measuring the quarter chord angle at the leading edge 31 of the vane being inspected. The first gage point 32 is in the form of a pin that extends vertically when the gage base is in starting position and which moves with the base as the latter is rotated to bring the several points all into contact with the vane. This gage point 32 engages the vane or the leading edge. It will be understood that contact between the gage point 32 and the vane as the latter moves underneath the gage base causes the base to pivot on its axis in a counterclockwise direction.

The other two gage points 34 and 36 also extend from the base and are spaced away from the point 32 and spaced from each other to engage the convex side of the vane at points spaced from the edge and from one another chordwise of the vane. The starting position of these points and the base is shown in FIG. 1. The measuring point or position with all three points contacting the vane is shown in FIG. 3. It will be understood that the same device may operate in the same way on the trailing edge of the vane as shown in FIG. 4 where the gage point 32 engages the trailing edge 38 of the vane and the points 34 and 36 engage the concave side as points spaced chordwise from the trailing edge 38.

The gage base has an integral part, a cam 40, extending upwardly from the pivot and having an arcuate cam surface 42 gradually extending from a point 44 relatively close to the pivot at one end of the surface to a point 46 at the other end at a greater distance from the pivot point.

This cam engages the sensor 48 of a transducer 50 carried by the slide. With this cam and sensor in the arrangement shown, the transducer will accurately indicate the precise angle of the base when the three gage points are all in contact with the vane and thus will indicate the precise quarter chord angle of the leading edge of the vane. It is obvious that as the base rotates counterclockwise to position all three of the gage points in simultaneous contact of the vane that the cam 40 moves with the base carrying the surface 42 underneath the sensor 48 which follows the surface of the cam being vertically moved with respect to the transducer.

The device is intended to inspect each gage successively in a continuous process by a continuous movement of the row of vanes underneath the gage by a rotation of the table. To accomplish this the gage base is urged by a spring 52 into the starting of FIG. 1. One end of this spring is on pin 54 on the cam, the other end is on a pin 56 secured to a fixed guide 60. As the vane moves relative to the gage base it is caused to turn, carrying with it the cam 40 so that when the contacts all engage the vane the cam will indicate the precise angle of the quarter chord.

The contacts 34 and 36 are prevented from accidental contact with the edge of the vanes as they move beneath the gage by the guide 60 secured to the slide and extending beyond the gage points when they are in the starting position as shown in FIG. 1. This guide engages with the leading edge of the vane and elevates the gage base adequately to keep the gage points out of contact with the vane as will be apparent.

In the operation of the mechanical part of the device the row of vanes is moved to the right beneath the gage as shown by the arrow 62 of FIG. 1. As this occurs, the leading edge 31 of the vane engages the gage point 32 as the guide 60 allows the gage to move lower onto the vane. As the vane continues its horizontal movement, engagement between the vane and the guide pin 32 causes the gage base to rotate counterclockwise and bring the gage points 34 and 36 toward the vane surface and ultimately into contact with the vane surface. When a point is reached as the base turns counterclockwise that all three gage points are simultaneously in contact with the vane at the three spaced inspection points, the cam is in a position to indicate the quarter chord angle being measured and the transducer sensor following the cam will indicate the angle.

After this particular position of the cam has been recorded, at the moment of the contact of all three gage points with the vane continued movement of the vane assembly under the gage turns each gage base further as a result of the gage point 32 riding over the edge of the vane until the tip of the gage point 32 clears the leading edge. Then spring 52 swings the base back into starting position in readiness for the inspection of the next vane. Continued movement of the vane ring carries the next vane into position to be engaged by gage pin 32. As the vane assembly moves beneath the gage structure, the guide 60 engages a forthcoming vane and lifts the gage base upwardly to prevent contact of the gage points 34 and 36 with the edge of the vane.

As the next vane to be inspected leaves the position of the vane in FIG. 1, a repetition of the operation continues. It is clear that this is a continuous operation and is carried out by a continuous uninterrupted forward movement of the row of vanes beneath the gage mechanism.

Referring now to FIG. 2 transducer 50 is connected by electrical leads 62 to the transducer electronic recording box and printer 64 which serves to record the particular position of the cam and thus the quarter chord angle for each vane. This occurs when the transducer is actuated by a signal from the gage contact detector box 65. The three gage points 32, 34 and 36 are connected by electrical leads 66, 68 and 70 and when contact is made between the vane and all three contacts at the time circuits within the detector box 65 are completed to signal to the transducer recording box to function to record the angle of the cam at that moment.

Immediately the contact among the gages is broken and the electronic mechanism will be reset in readiness for the gaging operation on the next vane.

It will be understood that after the entire set of vanes has been checked for the quarter chord angle at one selected position lengthwise of each vane the mechanism may incorporate adjustments to move the entire gage head toward or away from the axis of the table and thus move it in respect to the axis of the vane assembly so that a second location of the chord angle measurements may be taken at another position lengthwise of each of the vanes.

Although the device is shown as applied directly to the gaging of the quarter chord angle of the leading edge of the vane it is equally operable. As above stated, the gaging of the trailing edge is indicated in FIG. 4 and as described above.

It should be understood that the invention is not limited to the particular embodiments shown and described herein, but that various changes and modifications may be made without departing from the spirit and scope of this novel concept as defined by the following claims.

I claim:

1. A gas device for measuring the quarter chord angle of a compresor vane in a row of vanes in an assembly including:

a table supporting a vane assembly, a gage support above the table, a slide vertically movable on the support, a gage base pivoted on the slide and having a cam thereon, a transducer on the slide having a movable sensor engaging said cam, a plurality of gage points on the base to engage the vane at least at three spaced points and the base is turned on its pivot, and means for sensing when the several gage points are all in contact with the workpiece to activate the transducer.

2. A gage device as in claim 1 including other sensing means to record the position of the transducer sensor when the first sensing means are activated.

3. A gage device as in claim 1 in which a spring urges the base into a starting position for the measuring operation.

4. A gage device as in claim 1 in which the vane is move relative to the base, to cause the base to turn on its pivot to bring the gage points into engagement with the vane.

5. A gage device as in claim 1 including a guide on a slide in a position relative to the base to protect the gage points from contact with the vane as the latter is moved into position to be gaged.

6. A gage device as in claim 1 in which the table is rotary to position the vanes in the vane assembly successively under and past the gage base.

7. A gage device as in claim 6 including a guide on the slide adjacent the gage points to protect the gage points from contact with the vanes in the assembly as they are moved successively under the gage base.

8. A gage device as in claim 1 in which one gage point is a pin engaging the vane and cooperating with the vane as it moves relative to the gage base to turn the base and cause the other gage points to contact the vane.

9. A gage device as in claim 1 in which electrical leads from the gage points activate the transducer when the vane establishes electrical contact among all the gage points.

10. A gage for a device for measuring the quarter chord angle of each vane in a row of compressor vanes in the vane assembly including:

a table on which a vane assembly with a plurality of vanes is mounted, a pivoted gage base above the table and having a cam thereon movable with the base, a sensing means engaging and actuated by the cam, at least three spaced gage points on the base, one point being in a position to be engaged by the vane near one of its edges and cause movement of the base on its pivot as the vane moves past the base, and the other gage points on the base being in spaced relation with the first and in a position to engage the vane at spaced points chordwise of the vane, and means for sensing when all three gage points are in contact with the vane for actuating the transducer.

11. A gage device as in claim 10 including recording means for recording the position of the cam to be energized by the transducer when actuated by the sensing means.

12. A gage device as in claim 10 in which the table is rotary for moving the vane assembly thereon past the gage base.

* * * * *

UNITED STATES PATENT AND TRADEMARK OFFICE
CERTIFICATE OF CORRECTION

PATENT NO. : 4,597,187

DATED : July 1, 1986

INVENTOR(S) : Daniel L. King

It is certified that error appears in the above-identified patent and that said Letters Patent is hereby corrected as shown below:

Column 2, line 13: after "result", change "of" to --is--

Column 3, line 1: after "is", change "provided" to --pivoted--

Signed and Sealed this

Fourteenth Day of April, 1987

Attest:

DONALD J. QUIGG

Attesting Officer

Commissioner of Patents and Trademarks